(No Model.)
W. SMITH & J. CLAYDON.
MACHINE FOR CUTTING OR SLICING VEGETABLES.
No. 485,590. Patented Nov. 1, 1892.
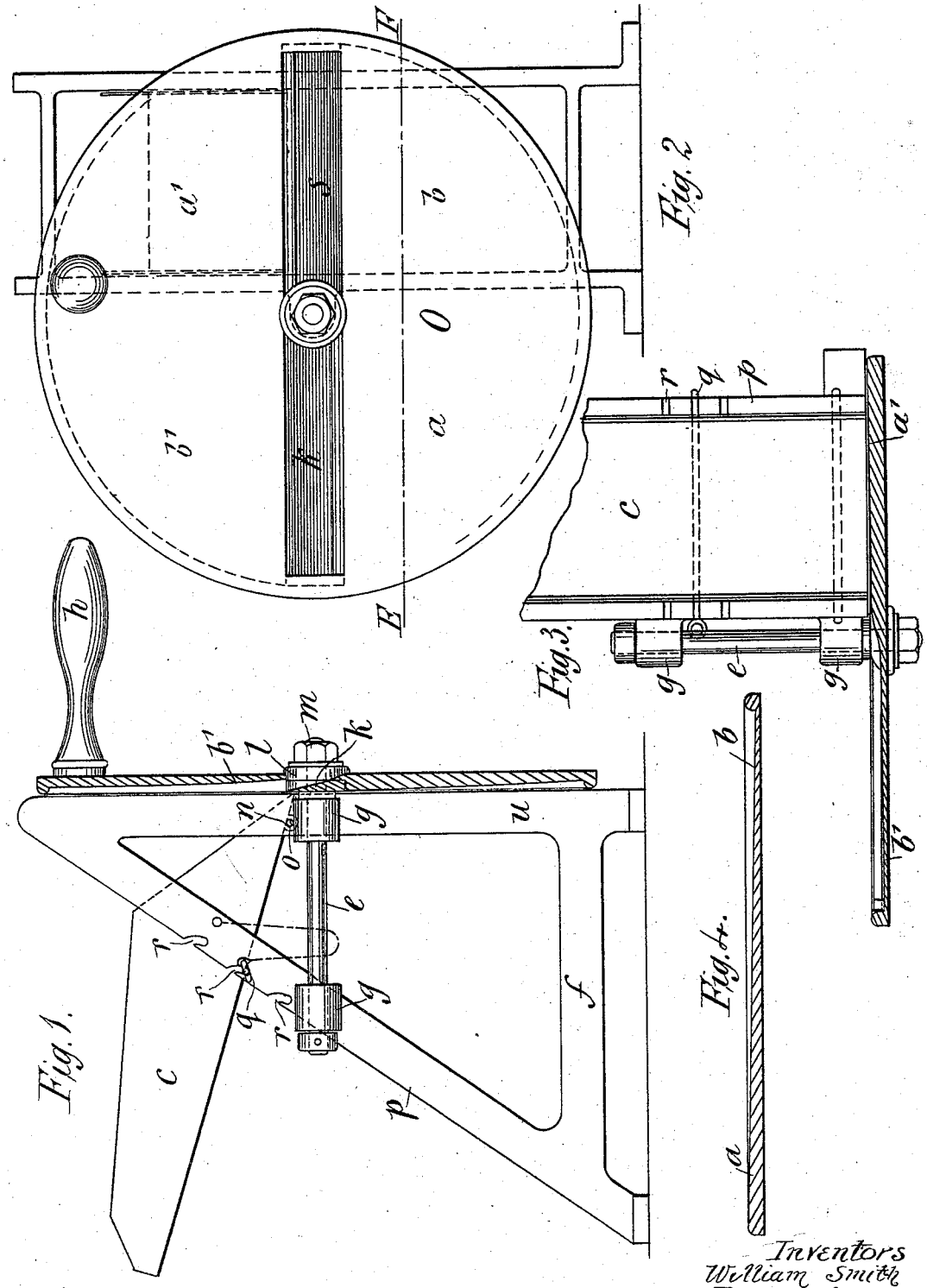
Witnesses
Albert Edward Ellen
Ernest William Brooke
Inventors
William Smith
James Claydon
per George Henry Rayner
Attorney

UNITED STATES PATENT OFFICE.

WILLIAM SMITH AND JAMES CLAYDON, OF LONDON, ENGLAND.

MACHINE FOR CUTTING OR SLICING VEGETABLES.

SPECIFICATION forming part of Letters Patent No. 485,590, dated November 1, 1892.

Application filed October 29, 1891. Serial No. 410,247. (No model.)

*To all whom it may concern:*

Be it known that we, WILLIAM SMITH and JAMES CLAYDON, manufacturers, subjects of the Queen of Great Britain and Ireland, residing at 160 High Street, Borough, London, England, have invented a new or Improved Machine for Cutting or Slicing Vegetables and other Similar Substances, of which the following is a specification.

Our invention relates to an improved machine for slicing vegetables, such as potatoes, cucumbers, and the like, whereby the thickness of the slices may be graduated according as required and the slicing operation may be performed continuously by means of a handle.

In the accompanying drawings, Figure 1 is a side elevation of the machine with the cutting-disk in section. Fig. 2 is a front view of the same. Fig. 3 is a broken plan of the machine with the cutting-disk likewise in section. Fig. 4 is a section of the disk on line E F of Fig. 2.

Our improved slicing-machine consists, essentially, of a frame $f$, resembling a pair of steps and furnished with two centrally-perforated lugs $g$, carrying an axis $e$, upon the front extremity of which is mounted a disk of special construction secured thereto by a hub $l$ and a nut $m$. This disk O has a rectangular slot $s$ extending diametrically across the same and close to its outer periphery. Parts of the edges of this slot are beveled in front in such a manner that one half—say the upper half—of the right-hand edge, as well as the lower half of the left-hand edge, are beveled to correspond, respectively, with the half-backs or thick half-edges of the knife K, mounted on the axis $e$, while the other half-edges of the said knife are cutting-edges and are placed at a distance above the corresponding edges of the slot $s$. The rear side of the disk is formed with raised and thinned parts or surfaces $a$ $a'$ and $b$ $b'$, merging into one another and arranged diametrically opposite one another in such a manner that the half-backs or half thick edges of the knife bear against the diametrically-opposite thick edges of the raised parts of the disk, while its half cutting-edges are placed at a distance above the diametrically-opposite edges of the thinned parts. The merging of the raised or thick surfaces into the thinned parts has for its object to facilitate the feeding of the vegetable to the knife-edges and the ready removal of the cut slices, which fall down as soon as cut off. The disk is furnished with a handle $h$, as shown in Fig. 1.

The slicing-machine is further provided with a feeding tray or trough $c$, upon which is placed the vegetable requiring to be sliced and which has preferably the shape shown in Fig. 1. This tray is furnished in front with a hinge $n$, through which passes a pin $o$, attached to the frame $f$ by a string or chain and passing, also, through corresponding holes formed in the two rear uprights $u$ of the said frame, so that the tray may be more or less inclined in front, according to the thickness of the slices required, while its rear end is supported by means of a pin $q$ passing through any two corresponding notches $r$ required and formed in the sides of the two inclined bars $p$ of the frame $f$.

What we claim, and desire to secure by Letters Patent of the United States, is—

In a machine for slicing vegetables and other similar substances, the combination of a disk O, mounted upon a spindle attached to the frame $f$ and having a slot extending diametrically across it, the rear surface of the disk being inclined in two directions, one from the upper edge of the slot on one side of the center to the upper edge on the other side, the other at the opposite sides of the lower edge, two radial knives K, and a sloping tray, substantially as described, and shown in the accompanying drawings.

In witness whereof we have hereunto set our hands in presence of two witnesses.

WILLIAM SMITH.
JAMES CLAYDON.

In presence of—
ALBERT EDWARD ELLEN,
ERNEST WILLIAM BROOKE,
*Both of 37 Chancery Lane, London.*